C. RUDE.
FLOUR SIFTER ATTACHMENT.
APPLICATION FILED NOV. 5, 1920.
1,427,643.
Patented Aug. 29, 1922.
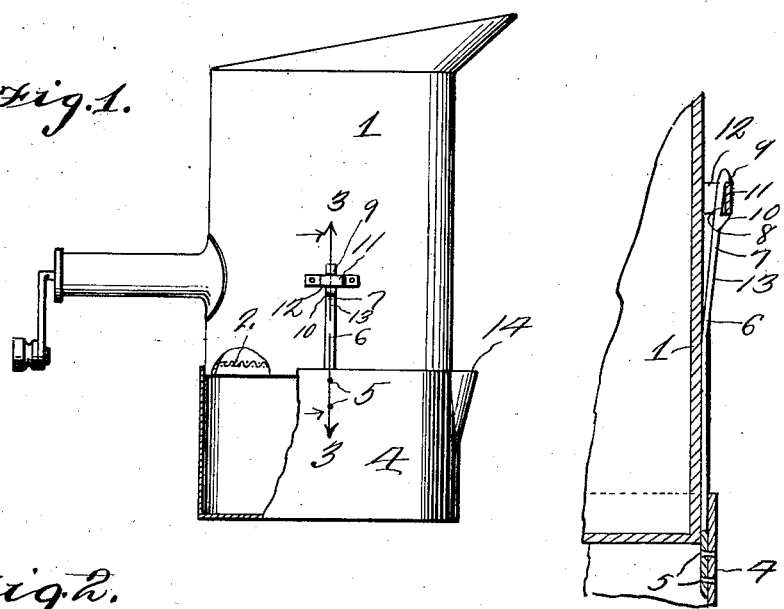
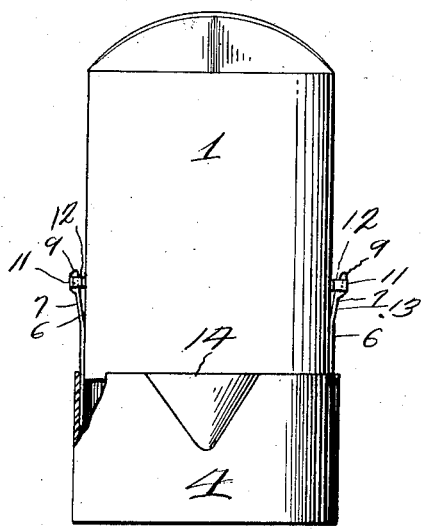
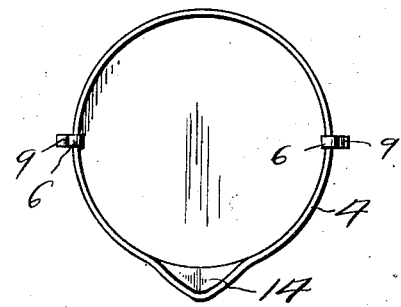
Inventor
Cora Rude
By D. Swift
Attorney

UNITED STATES PATENT OFFICE.

CORA RUDE, OF VOLIN, SOUTH DAKOTA.

FLOUR-SIFTER ATTACHMENT.

1,427,643.  Specification of Letters Patent.  Patented Aug. 29, 1922.

Application filed November 5, 1920. Serial No. 421,905.

*To all whom it may concern:*

Be it known that I, CORA RUDE, a citizen of the United States residing at Volin, in the county of Yankton, State of South Dakota, have invented a new and useful Flour-Sifter Attachment; and I do hereby declare the following to be a full, clear, and exact description of the invention such as will enable others skilled in the art to which it appertains to make and use the same.

The invention relates to flour sifters and has for its object to provide an attachment comprising a receptacle having spring arms adapted to engage members carried by the sifter body and hold the receptacle in position beneath the lower end of the sifter so that flour or any other article which is sifted through the sifter will be deposited in a receptacle and the flour again dumped into the sifter so that it can be resifted. The particular advantage is that a great many recipes require that the flour or other article be sifted several times, and where this is done it is necessary to provide a container of some character into which the material may be deposited so that it can be again dumped into the sifter. By providing the detachable receptacle, said receptacle is maintained at all times with the sifter.

A further object is to provide a detachable receptacle for a sifter comprising a receptacle larger than the lower end of the sifter and adapted to receive the lower end of the sifter, said receptacle at diametrically opposite points thereof being provided with spring noted arms which engage loops carried by opposite sides of the sifter for holding the receptacle in place on the sifter.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a side elevation of the sifter showing the receptacle in place thereon and parts broken away to show the interior of the receptacle and the screen in the bottom of the sifter.

Figure 2 is a front elevation of the sifter showing the receptacle in place thereon.

Figure 3 is a detail sectional view taken on line 3—3 of Figure 1.

Figure 4 is a top plan view of the receptacle.

Referring to the drawings, the numeral 1 designates a conventional form of sifter and 2 the screen in the bottom thereof, through which screen flour or any other article that is being sifted is forced. Many recipes require that some articles be sifted several times, therefore a detachable receptacle 4 is detachably connected to the lower end of the sifter 1 and into which receptacle the sifted material as it is forced through the sifter 2 is deposited so that it can be dumped again into the sifter 1 after the receptacle 2 has been detached, the receptacle being again attached to the lower end of the sifter 1. The above operation is repeated as often as desired. The receptacle 4 has secured thereto by means of rivets 5, and at diametrically opposite points thereof spring arms 6 which spring outwardly at their upper ends 7. The upper ends of the spring arms 6 are provided with recesses 8 formed by spaced lugs 9 and 10, which recesses receive the portions 11 of cleats 12 which are secured to the sides of the sifter 1. To place the receptacle on the sifter 1 the sifter is placed between the arms and moved downwardly at the same time pressure is applied to the upper ends of the springs 6 at the points 13 so that the ends of the springs will enter the cleats 12 and when released will receive the portions 11 of the cleats 12. After the material has been sifted into the receptacle 4 and it is desired to remove said receptacle and deposit the contents thereof in the sifter 1, it will only be necessary for the operator to again apply pressure to the spring arms 6 at the points 13 and then move said arms downwardly until they clear the portions 11 of the cleats 12, after which the contents of the receptacle 4 may be dumped into the sifter 1 through the spout 14.

From the above it will be seen that a detachable receptacle is provided for a sifter which may be easily and quickly applied or removed and one wherein the receptacle may be maintained with the sifter at all times.

The invention having been set forth what is claimed as new and useful is:—

1. The combination with a culinary sifting device having a screen in the bottom thereof, of a detachable receptacle carried by said sifter and disposed below the lower end thereof, said receptacle at diametrically opposite walls thereof being provided with upwardly extending spring arms having recesses adjacent their upper ends, the upper portions of the spring arms extending outwardly and upwardly and forming guiding means for guiding the lower end of the sifter into place within the opening of the detachable receptacle, members carried by the sifter and adapted to be received by the recesses of the spring arms, a spout carried by the detachable receptacle and so positioned that when the detachable receptacle is in place, material which is forced through the sifter may be poured from the detachable receptacle without detaching the detachable receptacle.

2. The combination with a removable receptacle adapted to telescopically engage the discharge end of a sifting device, of means for guiding the discharge end of the sifting device into the removable receptacle and for holding said receptacle in place, said means comprising upwardly and outwardly extending spring arms adapted to engage the sides of the discharge end of the piston and guide the same to a position in the receptacle, the upper ends of said arms provided with means cooperating with members carried by the sifting device for holding the receptacle against movement.

In testimony whereof I have signed my name to this specification in the presence of two subscribing witnesses.

CORA RUDE.

Witnesses:
ANNA EKERN,
C. A. O'DONNELL.